June 7, 1927.  1,631,477
F. L. EIDMANN
COLLAPSIBLE HANDLE FOR PORTABLE ELEVATORS
Filed Jan. 2, 1924   3 Sheets-Sheet 1
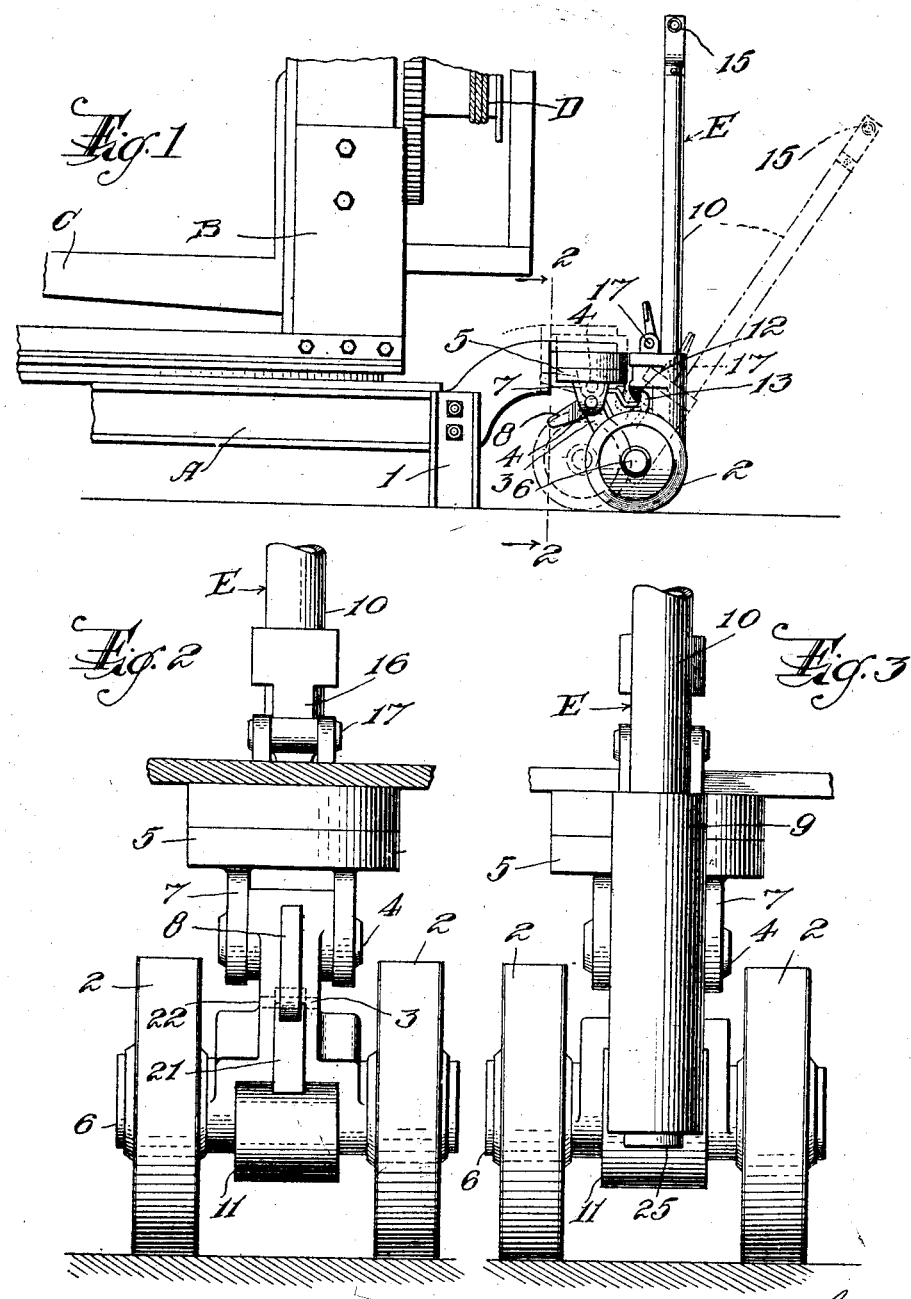

June 7, 1927.  
F. L. EIDMANN  
1,631,477  
COLLAPSIBLE HANDLE FOR PORTABLE ELEVATORS  
Filed Jan. 2, 1924   3 Sheets-Sheet 2
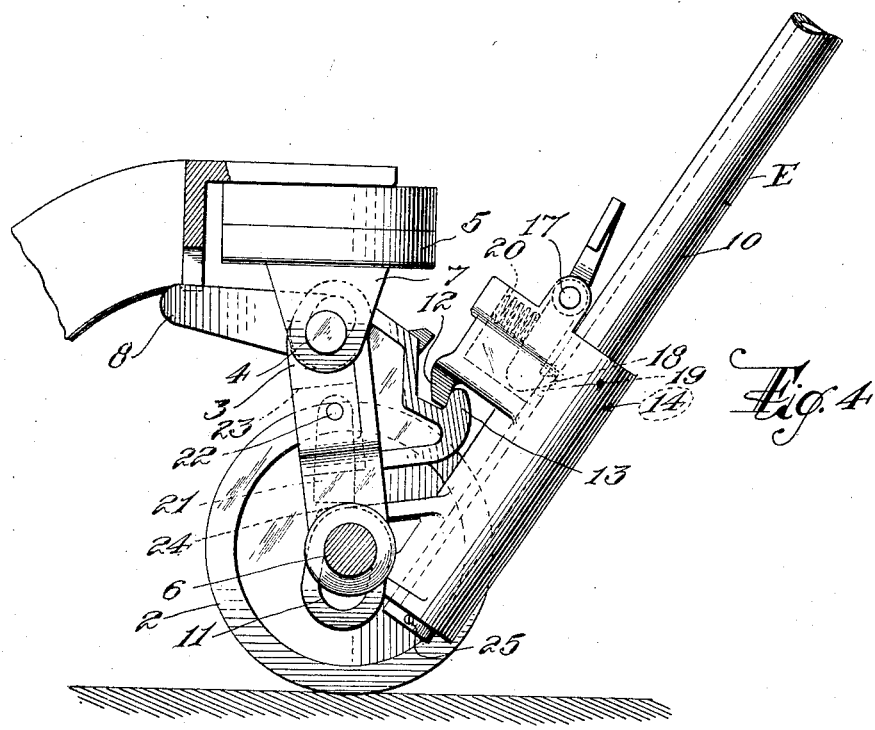
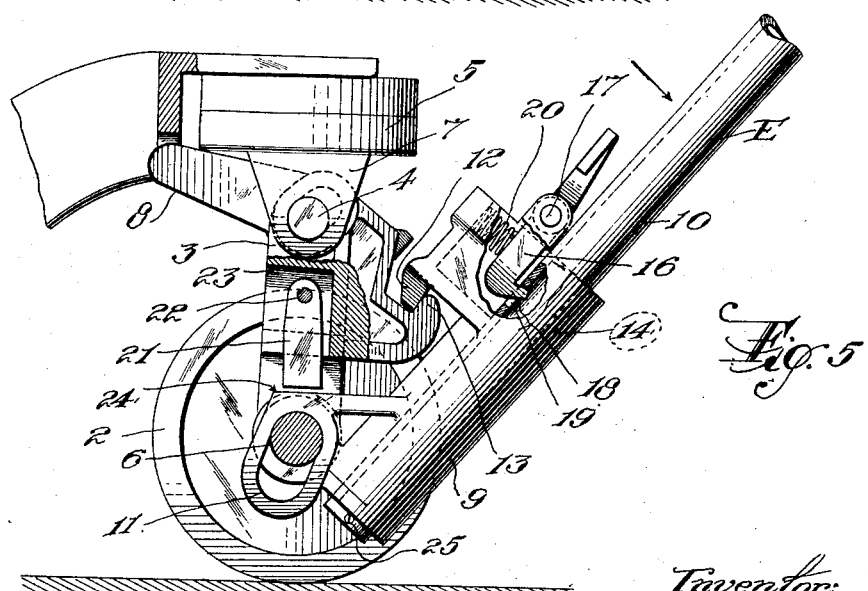

June 7, 1927.

F. L. EIDMANN 1,631,477

COLLAPSIBLE HANDLE FOR PORTABLE ELEVATORS

Filed Jan. 2, 1924

Patented June 7, 1927.

1,631,477

UNITED STATES PATENT OFFICE.

FRANK L. EIDMANN, OF NORTH BERGEN, NEW JERSEY, ASSIGNOR TO HENRY S. GERMOND, JR., OF BAYONNE, NEW JERSEY.

COLLAPSIBLE HANDLE FOR PORTABLE ELEVATORS.

Application filed January 2, 1924. Serial No. 683,917.

This invention relates in general to draft handles or tongues for trucks and more particularly to a draft and truck elevating handle for revolving portable elevators which comprise a main frame or truck mounted on wheels and a revolving elevator frame mounted on said truck and carrying a lifting platform and hoisting mechanism therefor. In such machines it is desirable and necessary for safety to the operator to so mount the draft handle that while the machine is being used for elevating a load, the handle may be swung into an out-of-the way position where it cannot be stumbled over or otherwise interfere with the operation of the machine. The handle cannot be left in a vertical position since it would then interfere with the revolving of the elevator frame and platform, and it is not safe to leave the handle prone on the floor and projecting from the machine since it would be an obstruction and potential danger under the feet of the operator.

Machines of this character are also frequently constructed with certain of the wheels so mounted as to be adapted to be adjusted relatively to the truck to raise and lower the same in such a manner as to permit a portion of the truck, for instance rigid legs, to be brought into frictional engagement with the ground or floor when the machine is to be used for elevating a load, to prevent the truck from accidentally rolling from the desired location, the draft handle being utilized for adjusting or manipulating said wheels.

One object of the present invention is to provide a draft and elevating handle for machines of the character described embodying novel and improved features of construction whereby the handle may be collapsed and swung into an almost completely out-of-the way position beneath the truck.

Another object is to provide in a machine of the character described a novel and improved combination of such a draft handle with means for manipulating certain of the wheels of the truck to raise and lower the same, said handle and said means cooperating in such a manner that the handle may be collapsed and swung beneath the truck only after the truck has been lowered into frictional engagement with the floor or ground, thereby ensuring against the operator accidentally losing control of the machine either when drawing it about from place to place or when raising or lowering the truck.

Further objects are to provide such a draft handle comprising a plurality of telescoping parts adapted to be selectively interlocked and disconnected for relative movement, one of said parts being pivotally connected to the truck so as to swing in a vertical plane into engagement with a floor or the ground, whereby the handle can be collapsed and positioned beneath the truck; to provide a novel and improved combination of such a handle with steering wheels for a truck swiveled in the truck and adapted to be adjusted to raise and lower the truck, one part of said handle having a pivotal and detachably interlocking relation to the mounting for said wheels, whereby the handle may be used to manipulate the wheels to raise and lower the truck and for drawing the truck from place to place when said handle is interlocked with said wheel mounting, the handle being adapted to be collapsed and swung with the wheel mounting beneath the truck when said handle is released from said interlock with the wheel mounting; to provide novel and improved automatic means for preventing said handle from becoming released from interlock with said wheel mounting while the handle is being used for drawing or raising or lowering the truck, and releasing said handle from said interlock after the truck has been lowered, and to obtain other results and advantages as may be brought out by the following description.

A collapsible handle embodying the invention is adapted to be utilized with any type of truck where a handle which may be thrown into an out-of-the way position is desirable, but the invention is particularly designed for use in connection with revolving portable elevators, such for instance as shown in Patent No. 854,961 of May 28, 1907 to T. J. McCarthy, where a collapsible handle is highly desirable if not a necessity. For the purpose of illustrating the principles of the invention I have shown in the accompanying drawings a collapsible handle constructed in accordance with the invention in connection with a revolving portable elevator.

Referring to said drawings in which the same reference characters designate corresponding and like parts.

Figure 1 is a fragmentary side elevation of a revolving portable elevator of known construction having a collapsible handle and truck elevating mechanism embodying my invention applied thereto;

Figure 2 is an enlarged rear elevation of the truck elevating mechanism and collapsible handle, viewing the same from the line 2—2 of Figure 1;

Figure 3 is a front elevation of the handle and truck elevating mechanism illustrated in the position shown in Figure 1;

Figure 4 is an enlarged partial side elevation and partial sectional view of the handle and truck elevating mechanism in a position intermediate the lower position of the truck and the uppermost elevated position.

Figure 5 is a view similar to Figure 4 showing the handle and elevating mechanism in the position assumed when the truck is raised to its uppermost position;

Figure 6:
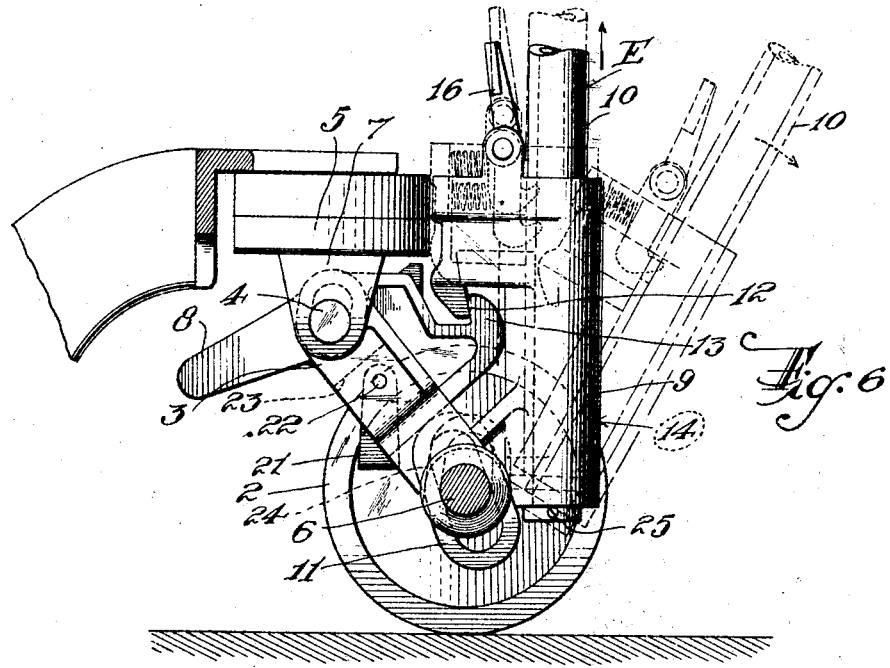
Figure 6 is a side elevation of the handle and elevating mechanism in the position assumed when the truck is in its lowermost position in engagement with the floor.

In the specific embodiment of the invention shown on the drawings, the reference character A designates the frame of the truck of a revolving portable elevator which is mounted at the rear end on wheels (not shown). The frame may be of any suitable construction and has revolubly mounted thereon an elevating frame B on which is mounted a lifting platform C which is adapted to be raised and lowered on the elevating frame B by means of suitable hoisting mechanism D. The forward end of the frame A of the truck is provided with rigid legs 1 adapted to frictionally and fixedly engage a floor or the ground to hold the truck against rolling when the machine is being used for elevating a load.

For the purpose of drawing the truck from place to place and steering the same, steering wheels 2 are provided at the forward end of the frame of the truck, said steering wheels being carried on one arm of a two-arm lever 3 pivotally mounted on a horizontal axis 4 intermediate the arms of a swivel 5 disposed substantially centrally of the width of the truck. The wheels are shown as journaled on an axle 6 mounted in the lever 3, and the lever is pivoted on a pin 4 between spaced ears 7 secured to the swivel 5. With this construction it will be observed that the wheels are adapted to be revolved about a substantially vertical axis determined by the axis of the swivel 5 for the purpose of steering the truck as it is moved from place to place. It will also be observed that by swinging of the lever 3 about the pin 4, the forward end of the truck may be raised or lowered. When the lever 3 is swung forwardly of the truck into the position shown in Figure 1, the forward end of the truck is lowered to permit engagement of the legs 1 with a floor or the ground, and when the lever 3 is swung rearwardly into the position shown by dotted lines in Figure 1 the forward end of the truck is raised to disengage the legs 1 from the floor so that the truck is supported solely by the wheels at the rear end and the steering wheels 2. The arm 8 of the lever 3 is adapted to engage the underside of the swivel 5 to limit the rearward swinging of the lever 3 to a point slightly beyond the dead center between the axle 6 and the pin 4. The lever 3 is adapted to be swung about the pin 4 to raise and lower the truck by means of a handle E which also serves for drawing the truck. It will be noted that when the handle E is in either of the positions shown in Figure 1, it materially interferes with the loading of the platform C and the movements of the operator about the machine. The construction so far generally described is broadly old, and no claim to novelty is made thereon.

In accordance with the present invention, the handle E is adapted to be collapsed and swung into an out-of-the way position beneath the truck A so as to in no way interfere with the loading or operation of the elevating mechanism or the movement of the operator about the machine. In the present instance the handle E is shown as comprising two telescoping or relatively longitudinal movable parts 9 and 10, the part 9 having a pin and slot connection 11 at one end with the axle 6 of the wheels 2 and being adapted to detachably interlock with the lever 3 so that the handle and said lever may be swung as an entity to raise and lower the truck. The inner side of the part 9 is provided with a downwardly projecting lug 12 adapted to cooperate with an upwardly projecting lug 13 on the front side of the lever 3. When the lugs 12 and 13 are in engagement with each other as shown in Figures 4 and 5, swinging of the handle in the direction indicated by the arrows will cause a corresponding swinging of the lever 3 to move the wheels 2 inwardly beneath the truck and elevate the latter.

The part 10 of the handle E is in the form of a tube slidably mounted in a longitudinal opening 14 in the part 9, the outer end of the part 10 being provided with hand grips 15. For interlocking the parts 9 and 10, the part 9 may be provided with a catch lever 16 pivoted intermediate its ends at 17 and having a head 18 at one end to engage a slot 19 in the part 10. A spring 20 may be provided for normally influencing the head 18 into the opening 19.

Figure 7:
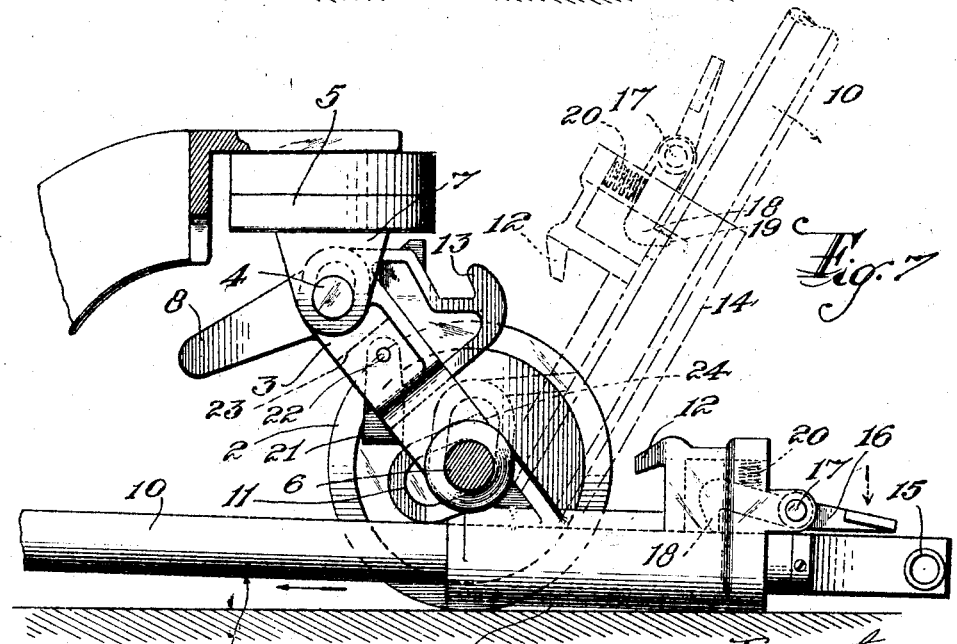
Figure 7 is a view similar to Figure 6 showing the handle collapsed and swung beneath the truck.

With this construction it will be noted that the pin and slot connection 11 of the part 9 with the axle 6 permits longitudinal movement of the part 9 relatively to the axle, and that when the handle is pulled upwardly, as shown by dotted lines in Figure 6, the lug 12 may be disengaged from the lug 13, whereupon the handle may swing downwardly about the axle 6, as indicated by dot and dash lines in Figures 6 and 7, into engagement with the floor or the ground. Furthermore, by releasing the head 18 of the catch 16 from the opening 19 of the part 10, said part may be slid longitudinally through the part 9, as clearly shown in Figure 7. With the handle in this position, by merely swinging the handle on the axis of the swivel 5, the handle may be positioned almost completely beneath the truck so that it is an only practically negligible obstruction to the movements of the operator of the machine.

It is desirable that the releasing of the part 9 of the handle from interlocking relation to the lever 3 be positively prevented while the truck is being raised or lowered or drawn from place to place by means of the handle. For this purpose I may utilize a gravity actuated pawl 21 pivotally mounted at one end at 22 within a recess 23 formed in the wheel supporting arm of the lever 3, said pawl being adapted to engage a projection 24 on the part 9 when the wheels 2 are in position to elevate the forward end of the truck from the floor, as shown in Figure 5, the relation of said pawl of the lever 3 being such that when the lever is in the position assumed when the forward end of the truck is in frictional engagement with the floor, the pawl by action of gravity is located so as not to engage the projection 24 of the part 9, as clearly shown in Figures 6 and 7. Obviously, the function of the pawl 21 is to prevent such movement of the part 9 on the axle 6 as would permit disengagement of the lugs 12 and 13. In view of the fact that the interlocking relation of the handle and the lever 3 can be released only when the legs 1 of the truck are in engagement with the floor or the ground, there is no possibility of the operator losing control of the truck either when raising or lowering the same or drawing it from place to place.

The head 18 of the catch lever 16 is preferably of such a shape as to easily permit said head to snap into the opening 19 of the part 10 as the latter is pulled outwardly of the part 9 into operative position, and to prevent the part 10 from being accidentally pulled out of engagement with the part 9 by failure of the catch 16, the lower end of the part 10 may be provided with a cross pin or the like 25 to engage the lower end of the part 9.

While I have shown and described the invention as embodying certain details of construction and as being utilized in connection with a certain type of portable elevator, it will be understood that this is mainly for the purpose of illustrating the principles of the invention and that many modifications and changes can be made in the details of construction and the invention used in connection with other devices, without departing from the spirit or scope of the invention. Therefore, I do not desire to be understood as limiting myself except as required by the following claims when construed in the light of the prior art.

Having thus described the invention, what I claim is:

1. The combination with a wheeled truck having certain of the wheels swiveled on a vertical axis for steering the truck, of a telescoping multi-part pull handle having one part thereof pivotally connected to said wheels to swing in a vertical plane, the parts of said handle constructed to releasably interlock and being capable of telescoping movement when released from interlocking relation, whereby the handle may be swung about its pivot to the floor, collapsed, and swung beneath the truck by rotation of said wheels on said swivel.

2. The combination with a wheeled truck, of mechanism for alternately changing the truck from a readily movable one to a fixed, stationary truck, including a telescoping multi-part pull handle by which the truck may be drawn from point to point along a floor and which is constructed to detachably interlock with other parts of said mechanism for actuating the same, the parts of said handle being constructed to detachably interlock with each other and being capable of telescoping movement when freed from their interlocking relation to permit the handle to be thrown into an almost out-of-the way position when the handle is disengaged from the other parts of said mechanism.

3. The combination with a wheeled truck, of mechanism for alternately changing the truck from a readily movable one to a fixed, stationary truck, including a telescoping two-part pull handle by which the truck may be drawn from point to point along a floor and which is constructed to detachably interlock with other parts of said mechanism for actuating the same, the parts of said handle being constructed to detachably interlock with each other and being capable of telescoping movement when freed from their interlocking relation to permit the handle to be thrown into an almost out-of-the way position when the handle is disengaged from the other parts of said mechanism, and means for preventing release of said interlock of the handle with said other parts of the mechanism while the truck is supported on said wheels and permitting release of said interlock when said handle is swung to lower the truck into frictional contact with the floor.

4. The combination with a wheeled truck, of mechanism for alternately changing the truck from a readily movable one to a fixed, stationary truck, including a pull handle by which the truck may be drawn from point to point along a floor and which is constructed to releasably interlock with other parts of said mechanism for actuating the same, and means for preventing release of said interlock of the handle with said other parts of the mechanism while the truck is supported on said wheels and permitting release of said interlock when said handle is swung to lower the truck into frictional contact with the floor.

5. The combination with a wheeled truck, of mechanism for alternately changing the truck from a readily movable one to a fixed, stationary truck, including a pull handle by which the truck may be drawn from point to point along a floor and which is constructed to releasably interlock with other parts of said mechanism for actuating the same, and a gravity actuated member for preventing release of said interlock of the handle with said other parts of the mechanism while the truck is supported on said wheels and permitting release of said interlock when said handle is swung to lower the truck into frictional contact with the floor.

6. The combination with a wheeled truck having supports adapted to frictionally contact with a floor to render the truck fixed or stationary, of a two-arm lever pivoted on a horizontal axis to the frame of the truck adjacent said supports, wheels journaled on one arm of said lever, a pull handle for drawing the truck from point to point along the floor pivotally connected to said lever to swing in a vertical plane and constructed to detachably interlock therewith to swing the same about its pivot to lower and raise the truck to engage and disengage said supports with the floor, and means for preventing release of said interlock of the handle with said lever while the truck is supported on said wheels and permitting release of said interlock when said handle is swung to lower the truck into frictional contact with the floor.

7. The combination with a wheeled truck having supports adapted to frictionally contact with a floor to render the truck fixed or stationary, of a two-arm lever pivoted on a horizontal axis to the frame of the truck adjacent said supports, wheels journaled on one arm of said lever, a pull handle for drawing the truck from point to point along the floor pivotally connected to said lever to swing in a vertical plane and constructed to detachably interlock therewith to swing the same about its pivot to lower and raise the truck to engage and disengage said supports with the floor, and a gravity actuated member mounted on said two-arm lever to releasably engage said handle for preventing release of said interlock of the handle with said other parts of the mechanism while the truck is supported on said wheels and permitting release of said interlock when said handle is swung to lower the truck into frictional contact with the floor.

8. The combination with a wheeled truck having supports adapted to frictionally contact with a floor to render the truck fixed or stationary, of a two-arm lever pivoted on a horizontal axis to the frame of the truck adjacent said supports, wheels journaled on one arm of said lever, a pull handle for drawing the truck from point to point along the floor pivotally connected to said lever to swing in a vertical plane and constructed to detachably interlock therewith to swing the same about its pivot to lower and raise the truck to engage and disengage said supports with the floor, said handle being capable of relative longitudinal movement with said lever to make and release said interlock, and means for preventing said relative longitudinal movement while the truck is supported on said wheels and permitting said longitudinal movement when the handle is swung to lower the truck into frictional contact with the floor.

9. The combination with a wheeled truck having supports adapted to frictionally contact with a floor to render the truck fixed or stationary, of a two-arm lever pivoted on a horizontal axis to the frame of the truck adjacent said supports, wheels journaled on one arm of said lever, a pull handle for drawing the truck from point to point along the floor pivotally connected to said lever to swing in a vertical plane and constructed to detachably interlock therewith to swing the same about its pivot to lower and raise the truck to engage and disengage said supports with the floor, said handle being capable of relative longitudinal movement with said lever to make and release said interlock, and a member carried by said two-arm lever and engaging said handle to prevent relative longitudinal movement of said handle and said lever while the truck is supported on said wheels and permitting said longitudinal movement when the handle is swung to lower the truck into frictional engagement with the floor.

10. The combination with a wheeled truck having supports adapted to frictionally contact with a floor to render the truck fixed or stationary, of a two-arm lever pivoted on a horizontal axis to the frame of the truck adjacent said supports, wheels journaled on one arm of said lever, a pull handle for drawing the truck from point to point along the floor pivotally connected to said lever to swing in a vertical plane and constructed to detachably interlock therewith to swing the same about its pivot to lower and raise the truck to engage and disengage said supports with the floor, said handle being capable of relative longitudinal movement with said lever to make and release said interlock, and a gravity actuated member mounted on said lever automatically interposed between said handle and said lever to prevent relative longitudinal movement of the handle and said lever while the truck is supported on said wheels and automatically swung out of said interposed relation to permit said longitudinal movement when the handle is swung to lower the truck into frictional engagement with the floor.

11. The combination with a wheeled truck having supports adapted to frictionally contact with a floor to render the truck fixed or stationary, of a lever pivoted on a horizontal axis on said truck, wheels journaled on the said lever, a pull handle having a pin and slot connection with said lever so as to be adapted for pivotal movement in a vertical plane and longitudinal movement, said lever and said handle being constructed to releasably interlock upon longitudinal movement of said handle whereby when said handle and said lever are interlocked said lever may be swung about its pivot by swinging of said handle to raise the truck on said wheels or lower it into frictional engagement with the floor, and a gravity actuated member pivotally mounted at one end on said lever and adapted to engage at its other end said handle when the truck is supported on said wheels to prevent longitudinal movement of said handle, said member being swung out of engagement with said handle when the latter is moved to lower the truck into frictional engagement with the floor so as to permit longitudinal movement of the handle and release of the interlock between said hande and said lever.

12. The combination with a wheeled truck having supports adapted to frictionally contact with a floor to render the truck fixed or stationary, of a lever pivoted on a horizontal axis on said truck, wheels journaled on the said lever, a telescoping multi-part pull handle one part of which is connected to said lever for pivotal movement in a vertical plane and longitudinal movement, the parts of said handle being constructed to releasably interlock and being capable of telescoping movement when released from interlock, said handle and said lever being constructed to releasably interlock upon longitudinal movement of said handle whereby when said handle and said lever are interlocked said lever may be swung about its pivot by swinging of said handle to raise the truck on said wheels or lower the truck into frictional engagement with the floor, said handle being adapted to be swung to the floor when released from interlock with said lever and said parts of the handle being telescoped so that the handle can be collapsed and located in an almost completely out-of-the way position beneath the truck.

13. The combination with a wheeled truck having supports adapted to frictionally contact with a floor to render the truck fixed or stationary, of a swivel mounted on said truck on a vertical axis, a lever mounted on said swivel to swing in a vertical plane, wheels journaled on said lever for supporting and steering the truck, a telescoping multi-part pull handle one part of which is connected to said lever for pivotal movement in a vertical plane and longitudinal movement, the parts of said handle being constructed to releasably interlock and being capable of telescoping movement when released from interlock, said handle and said lever being constructed to releasably interlock upon longitudinal movement of said handle whereby when said handle and said lever are interlocked said lever may be swung about its pivot by swinging of said handle to raise the truck on said wheels or lower the truck into frictional engagement with the floor, said handle being adapted to be swung to the floor when released from interlock with said lever and said parts of the handle being telescoped, whereby upon rotation of said swivel said handle may be swung into an almost completely out-of-the way position beneath the truck.

14. The combination with a wheeled truck having supports adapted to frictionally contact with a floor to render the truck fixed or stationary, of a lever pivoted on a horizontal axis on said truck, wheels journaled on the said lever, a telescoping multi-part pull handle one part of which is connected to said lever for pivotal movement in a vertical plane and longitudinal movement, the parts of said handle being constructed to releasably interlock and being capable of telescoping movement when released from interlock, said handle and said lever being constructed to releasably interlock upon longitudinal movement of said handle whereby when said handle and said lever are interlocked said lever may be swung about its pivot by swinging of said handle to raise the truck on said wheels or lower the truck into frictional engagement with the floor, said handle being adapted to be swung to the floor when released from interlock with said lever and said parts of the handle being telescoped so that the handle can be collapsed and located in an almost out-of-the way position beneath the truck, and means for preventing said longitudinal movement of the handle while the truck is supported on said wheels and permitting said longitudinal movement when the handle is swung to lower the truck into frictional contact with the floor.

FRANK L. EIDMANN.